Aug. 25, 1953
L. P. BIEFELD
2,650,184
COATED CLOTH AND OTHER RESIN AND FIBER COMPOSITIONS
Filed Jan. 25, 1947
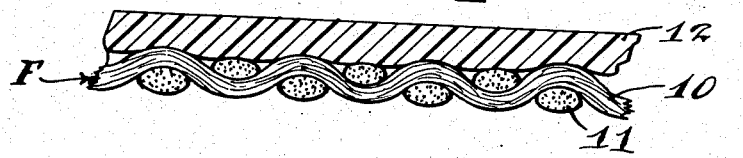
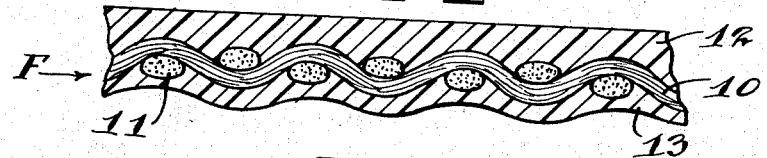
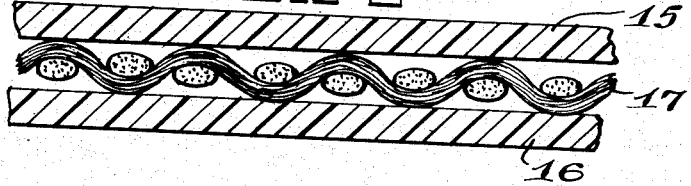
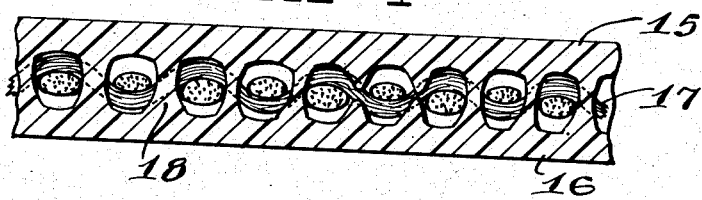
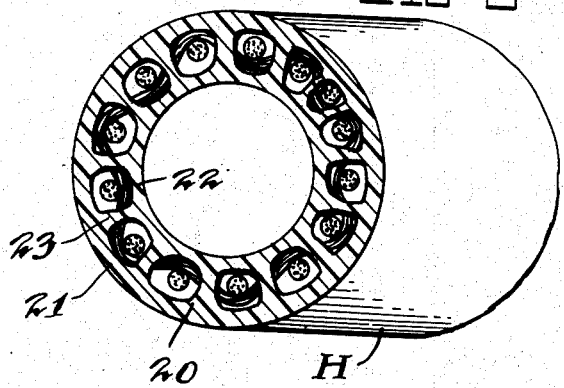
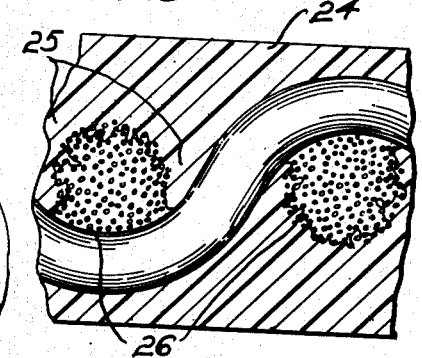
INVENTOR:
LAWRENCE P. BIEFELD
BY
Staelin & Overman
ATTYS.

Patented Aug. 25, 1953

2,650,184

UNITED STATES PATENT OFFICE 2,650,184

COATED CLOTH AND OTHER RESIN AND FIBER COMPOSITIONS

Lawrence P. Biefeld, Newark, Ohio, assignor to Owens-Corning Fiberglas Corporation, a corporation of Delaware Application January 25, 1947, Serial No. 724,316

2 Claims. (Cl. 154—128)

This invention relates to textile fabrics of glass fibers treated with resinous materials in the production of composite products having improved properties and characteristics. It relates particularly to coated cloth, that is, cloth combined with continuous void-free films of resinous materials, but is concerned also with composite materials having greater rigidity and form-retaining properties, such as resinous sheet material capable of being molded to desired shape in the making of articles of thin wall section.

Heretofore, in the combination of glass fibers with resinous materials to form coated cloth or other thin sheet material, the effort among fabricators has been directed toward the development of a greater bond between the glass fiber surfaces and the resinous materials. This has been influenced by the belief that the properties of the one can only be transmitted to the other through the medium of an intimate bond; that the exceptionally high strengths of the glass fibers are imparted to the plastic through the bond associating the fiber surfaces with the adjacent resinous bodies. I have found that this is not desirable in some cases. The bond between the ordinarily rigid resinous materials and the glass fibers prevents the relative movement of the fibers under stress so that, in view of their fairly low extensibility and high modulus of elasticity, the fibers of the fabric are easily broken under tearing stresses applied to the coated fabric, and the resin coated or impregnated fabric also exhibits lower strength under impact. This is unlike the wool, cotton, cellulose or resinous fibers that are used in organic textile fabrication.

I have found that if the glass fibers are held in combination with the resinous materials in a manner which enables the fibers individually to move relative to each other, the strength, especially the tear, impact and bursting strengths, whether the composite mass is exposed to wet or dry conditions, are greatly increased. The puncture resistance and flexure endurance are similarly improved. The freedom of movement of the fibers enables the fibers to act as bundles in resisting stresses substantially as if they were uncoated, instead of being subjected one by one to stresses. Furthermore, the resinous materials being present as substantial films or coatings are able to impart formability, color, and film continuity to the product as if the products were formed of sheets of pure resin. Thus, the properties of the resulting product are made cumulative and far surpass those of any one of the ingredients that make up the final composition.

The concept of this invention is directed to the limited freedom of movement of the glass fibers independently of the resinous materials with which they are combined, the freedom of movement resulting from the lack of adhesion and in some cases lack of contact between the resinous materials and the glass fiber surfaces. The salient features of this invention reside also in the means and processes for combing glass fibers with resinous materials in a manner to keep the adhesion between the fiber surfaces and the resinous bodies at a minimum. This and the products so made form a principal object of this invention.

Another object of this invention is to produce a new and improved resinous treated textile of glass fibers having many physical, chemical and electrical properties exceeding those of the separate materials themselves.

A further object is a method for producing a fabric of glass fibers and resins having many of the attributes and properties of the fibers and the characteristics of the resinous material.

A still further object is to produce a textile fabric of glass fibers pretreated with materials that tend to reduce the adhesiveness of the resinous coating material to the surfaces of the glass fibers which results in a plastic sheet having improved characteristics.

Another object is to produce laminated films of resinous material that are keyed to each other through the interstices of an intervening fabric of glass fibers which fibers are left free to move, resulting in a formable fabric of glass fibers and resinous materials having improved properties.

A still further object is to produce a composition of glass fibers and resinous materials in which the resinous materials do not fully penetrate into the fiber bundles enabling relative movement of the individual filaments or fibers by means of which an improved product results.

A still further object is to produce a flexible tubing of glass fibers and plastics.

Other objects and advantages of this invention will hereinafter appear, and for purposes of illustration but not of limitation, embodiments of the invention are shown in the accompanying drawings, in which:

Figure 1 is a longitudinal central sectional view of a fabric of glass fibers in combination with a film of resinous material disposed on one side thereof;

Figure 2 is a view of the elements of Figure 1 showing the resin disposition after the application of heat and pressure;

Figure 3 is a longitudinal central sectional view of a fabric of glass fibers disposed between two resinous films;

Figure 4 is a view of the elements shown in Figure 3, but after the application of heat and pressure;

Figure 5 is a fragmentary perspective view showing in cross section a flexible tubing made of resinous materials and a textile fabric of glass fibers; and Figure 6 is an enlarged detail view in section showing the resinous material partially impregnating the glass fiber strands in accordance with this invention.

According to the present invention, there is provided a fabric of glass fibers in the form of a woven sheet covered on at least one side, but preferably on both, with films of resinous material to provide a coated fabric for use as tentings, awnings, tarpaulins, and the like, or a sheet stock for the manufacture of small molded articles.

Textile fabrics of glass fibers which have been found suitable for the purpose described may be formed by various methods. One method consists of the haphazard arrangement of glass fibers in a layer or fabric in which position the fibers are interbonded by means of a small amount of resin. This type of fabric is often referred to as a "mat." Or the fabric of glass fibers may be made by interweaving substantially continuous yarns or strands of glass fibers on standard looms. A fabric of this type may be woven with both the warp 10 and fill 11 yarns composed of glass fibers to produce a fabric having exceptionally high strengths in both the longitudinal and transverse directions. Or, only the warp or fill yarns may be formed of glass fibers, while the other, for example, the fill yarns, are formed of organic fibers, such as silk, wool, hemp, cotton, or synthetic organic fibers as nylon (polyamide resin), rayon, vinyon (vinyl-copolymer) and the like.

The yarns or strands may be formed of a multiplicity of discontinuous fibers drafted into a sliver or yarn. They may also be formed by attenuating hundreds of streams of molten glass flowing from a glass melting receptacle. These attenuated streams are collected into a single strand which may be twisted or plied with other strands to form a yarn. Ordinarily in the continuous process, a size or lubricant is applied to the filaments before they are brought together. The size may consist of starch or a mixture of starches, hydrogenated oils, or other binding agents and lubricating agents individually or in combination. Since it is preferable to use a woven textile formed of yarns consisting of continuous filaments, the description of this invention will be made in connection with fabrics of that type. These woven textile fabrics may be closely woven, but for the purposes desired, it is preferable to use a loosely woven, open fabric which readily permits the small bodies of resin to flow through the interstices, and also to enable greater deformation in the post forming of the resinous coated fabric in the manner later described.

In one aspect of the invention, the glass fiber fabric is impregnated with a resinous material which, as applied, does not flow sufficiently to fill all of the interstices between the glass yarns or strands. When the resinous material is fully deposited, the resin films on the faces of the fabric are connected to each other by a certain amount of keying at spaced apart points through the fabric. In some instances, the necessary bond between film layers does not take place until the resinous materials are pressed together between heated platens whereby the resins flow sufficiently to fuse together at spaced apart points through the fabric. Thus, the glass filaments and in some cases the strands or yarns themselves are free to shift relative to each other and to the resinous material. The desirable properties of both the resinous material and the textile fabric are thus retained in the product.

This same concept is embodied in the use of more fluid resinous compounds or other methods of resinous compound application wherein the interstices between the glass yarns in the fabric are substantially impregnated, yet the resinous material is not sufficiently fluid or of a composition adapted freely to enter into the yarn or strand and completely coat the individual filaments. The resinous material thereby completely surrounds the strand or yarn but does not penetrate deeply into the yarn and the filaments in the fiber bundle are still free to move relative to each other and effect the desired result.

It is manifest that the ability of the resinous material to adhere to the glass fiber surfaces is of little importance in this aspect of the invention. Yet, the strength properties are further improved if the adhesion between the applied resin and glass fiber is low. Preferably, it is desirable to have no adhesion at all except for the small amount of mechanical adhesion caused by the surface characteristics of the yarns. This is illustrated in Figure 6 of the drawings.

As illustrated in Figure 1, disposed on one face of the fibrous fabric F is a film 12 of resinous material which might consist of a thin manufactured sheet, or else the film may be deposited there from a solution, emulsion or dispersion of the resinous material in suitable solvents or diluents, as by spraying, brushing, roller coating or dipping. However, in the latter instance, in view of the fact that it is desirable to apply the material as a viscous dope lacking sufficient flow even partially to impregnate the fabric and fill the interstices between the fibers, it is preferable that application be made by a knife or roller coating process of a high solids content resin compound or solution. Suitable coating and impregnating resins may also comprise a highly plasticized resinous material in which the resin is dispersed as fine particles in the plasticizer to form what is often referred to as a "plastisol" in which there are no volatile products or a slightly less plasticized resin may be dispersed in a non-solvent diluent to form what is often referred to as "organosols." These, like the ordinary resinous dopes, may be spread onto the fabric by the knife or roller coating processes and the like.

After the solvents or diluents have been driven from the applied coating, leaving as a residue a resinous film, or else, if a prefabricated resinous sheet is disposed on one side of the fibrous fabric, the subsequent application of heat and pressure, as by the disposition of the filmed cloth between the heated platens of a press or heated calender rolls, renders the resinous plastic so that they may fuse or flow through the interstices of the cloth subsequently to form a thin film 13 covering the opposite face of the fibrous fabric, as illustrated in Figure 2. In this operation, if the surfaces of the platens are smooth, the surfaces of the resinous films are likewise finished to provide a high gloss, as in "press polishing."

As used herein, the term "resinous material," comprising the residual film or sheet with which the glass fiber cloth is combined, includes both the rigid and non-rigid thermoplastic and the thermosetting natural and synthetic resins. Included among the thermosetting resinous compounds are the poly-condensation products of phenol, urea, melamine and other phenolic or amine compounds with aldehydes, such as formaldehyde, paraldehyde, furfuraldehyde or the like; the polymerization products of divinyl benzene and other styrene derivatives and halogenated products, allyl alcohol and its derivatives, acrylic esters, and the polyesters formed by the concomitant condensation and polymerization of polybasic alcohols and the polycarboxylic acids or the like, or copolymers of the latter copolymerizable monomers.

Suitable non-rigid thermoplastic organic resins include the polymerization products of the following thermoplastic resins having side chains of substantially long carbon length to comprise a permanently flexible polymer even when reacted to the full extent of linear growth, such as polybutene, polybutylene, n-butyl methacrylate, polyvinyl butyral, cellulose acetate-butyrate and the like, low molecular weight polymers resulting from the interruption of the polymerization reaction of the following thermoplastic resin forming monomers before the polymer has reached the full extent of linear growth, such as polystyrene having an average molecular weight below 5,000 or vinyl acetate and its chlorinated, alcohol, or acetal derivatives formed of an acetate having molecular weight below 3,000; or the thermoplastic resinous materials reacted to the full extent of linear growth such as the cellulose esters, including cellulose acetate, cellulose butyrate or the like, cellulose ethers as ethyl cellulose, benzyl cellulose or nitro cellulose, polystyrene or chlorinated polystyrene, acrylic esters, vinyl acetate, vinyl alcohol, vinyl chloride, vinyl acetals, copolymers of vinyl acetate and vinyl chlorides, polyvinylidene chloride-vinyl chloride copolymers, polybutene, polyethylene, polychloroprene, butadiene-acrylonitrile copolymers, and other organic polymerization products.

When the latter resinous materials are unplasticized, a more rigid formable sheet is provided having the attributes of a fabricated plastic sheet and the improved properties as previously pointed out. Also included is rubber or rubber-like compounds both synthetic or natural in solution, emulsion or dispersion or in sheet form. These include the butadiene-styrene (buna S) rubbers, thickol, butadiene-acrylonitrile rubbers, neoprene and the like.

It is to be understood that the resinous material may also include the more recently developed organo-silicon compounds such the the condensation products of the hydrolyzed silanes to produce heat hardenable and plasticizable polysiloxanes or silicones, such for example as the flexible di-octyl-polysiloxane, the more rigid di-ethyl-polysiloxane, di-methyl-polysiloxane, or di-benzyl silicone, or the rubber-like di-methyl silicone elastomer. In all of these compounds, the organic radical is linked to the silicon atom through the carbon atom. The radical may consist of the open-chain hydrocarbons such as the aliphatic or acyclic hydrocarbons with a hydrogen removed, or the closed chain or ring compounds such as the alicyclic, aromatic or heterocyclic compounds or their derivatives with a hydrogen removed. Although these materials exhibit good adhesion to glass, combinations can be made in such a manner that the resins do not completely impregnate or contact the individual glass fibers, but the resin films are joined together at spaced apart points by resin islands through the fiber cloth.

The following examples are illustrative of the invention:

EXAMPLE 1

Coating composition—solvent solution type 25 parts methyl methacrylate
20 parts dibutyl phthalate
15 parts methyl ethyl ketone
20 parts ethyl acetate
20 parts toluene The above solvent solution of the clear resins may be applied to the surfaces of the glass fiber fabric by means of the usual spray, dip, brush, spread, roller or knife coating processes. One or more passes may be made to build up the desired thickness of film but between each passage the coated fabric is subjected to elevated temperatures in the range of 200–250° F., to effect the removal of the solvents. The dried films are ordinarily of dull appearance and frequently the resin solution has not flowed sufficiently to penetrate into the interstices between the fabric yarns. For purposes of imparting a glossy finish to the resinous films, the sheets are pressed between calender rolls or platens heated to 250–350° F. whereby the resins are rendered fluid and flow sufficiently to enter the interstices and fuse with portions of the film from the opposite face. The surfaces also take on the polished finish of the engaging wall. This is known as "press polishing."

EXAMPLE 2

Coating composition—Latex type 50 parts polyvinyl chloride
10 parts di-octyl phthalate
39 parts water
1 part dispersing agent The ingredients of this composition are formed into a heavy aqueous dispersion and applied to the surface of the textile fabric of glass fibers by any of the methods described. The viscosity of this coating composition is such that the dispersion principally coats the surface of the fabric, but if the greater pressures are used in application, the material may be made to flow into the interstices between the yarns but not sufficiently to coat the individual fibers. The water is driven off on exposure of the coated fabric to elevated temperatures ranging from 250 to 300° F. for a short period of time. The resins in the dispersion are deposited as fine particles which are then fused in place by means of heating to fusion temperatures of 300 to 400° F., or by "press polishing" the fabric between heated platens or calender rolls.

EXAMPLE 3

Coating composition—"Organosol" type 28 parts vinylite VYNV
19 parts di-octyl phthalate
8 parts whiting
4 parts brown iron oxide
13 parts petroleum naphtha
30 parts xylene The "organosol" is a viscous high solids content compound in which the resinous particles are dispersed in thinners which do not operate to dissolve the resins. The "organosol" composition is applied to the textile fabric of glass fibers by any of the dip, spread, roller or knife coating processes. The coated fabric is first heated at 225 to 275° F. to drive off the diluents and then it is heated to 300 to 400° F. to fuse the resin particles in place to form a continuous resinous film on the surfaces of the fabric. Similarly, to the latex, the "organosol" may be made to impregnate the fabric but not to penetrate between the filaments of the yarns or strands. Thus, when fused in place, the facing films are connected together through the fabric, but the fibers or filaments in the strand or yarn are still free for relative movement. The coated fabric may be "press polished" to improve the sheen as well as to further harden the coating.

EXAMPLE 4

*Coating composition—"Plastisol" type*

42 parts vinylite VYNW
32 parts di-octyl phthalate
10 parts tri-cresyl phosphate
10 parts whiting
6 parts iron oxide The "plastisol" is a viscous 100 percent solids content compound in which the resinous material is dispersed as fine particles in the plasticizer. The compound is handled and treated similarly to that described in connection with the "organosols." Since no diluents are present to be driven off, the coated fabric may be immediately heated to the resin fusion temperature.

The adhesion of the resinous coatings may be further reduced by employing a higher twist in the yarns of the interwoven fabric. For instance increasing the twist of the yarns from about four and one-half turns per inch to seven and one-half turns per inch achieves improvements in flexure endurance and tear strength of over 100 percent and of about seventy-five percent respectively in the coated fabric.

The adhesion of most resinous materials to the glass fiber surfaces is also further reduced and the wet strength of the resin and fiber combination increased if the glass fibers are first coated with cationic amine salts, including the quaternary ammonium salts, having a long chain alkyl group greater than 10 carbon atoms in the positive radical. The same result is also achieved by first applying to the fibers organo-silicon compounds such as the halogenated silanes and their hydrolyzed polycondensation products in which, in the silane, the organic radical is connected to the silicon atom through the carbon atom in accordance with the formula $R_nSiX_{4-n}$, where X is a halogen, $n$ is a number from 1–3, and R is a saturated or unsaturated organic radical selected from the group of open chain aliphatic or acyclic hydrocarbons, closed chain or ring compounds such as the alicyclic, carbocyclic or heterocyclic hydrocarbons or their homologues or derivatives. Instead of either of these, there may be used the organo-metallic complexes such as cyanoacetic acid chrome complexes. Formulations illustrating suitable treating materials are as follows:

EXAMPLE 5

*Glass finishing compound: organo-silicon resin*

1 part octadecyl trichloro silane
99 parts toluene

The finish compound is applied to the glass fiber surfaces and dried at 150 to 250° F. For such purposes, the first size previously applied to the glass surfaces may be first removed, as by pyrolysis or by means of an aqueous soda ash solution, but this is not necessary. The resin materials previously described may be applied to the textile formed of the treated glass fibers. The resinous materials which penetrate into the fabric do not operate effectively to bond the glass fibers in place and they are able to move relative to each other and the resinous materials as desired.

EXAMPLE 6

*Glass fiber finishing compound: organo-metallic salt*

2 parts stearato chromic-chloride supplied under the designation of G1050 AI by the E. I. DuPont Company
98 parts water This solution is applied to the surfaces of the glass fibers by the dip coating process and dried thereon at 200 to 300° F. The starch or other size applied to the fibers during their manufacture may be removed from the fiber surfaces by being burned or washed off before this treatment. The treated fabric is adapted to be coated with the previously described resinous materials such, for example, as that of Example 3.

EXAMPLE 7

*Glass fiber finishing compound: cationic-amine salt*

2 parts of the reaction product of acetic acid with tetra ethylene pentamine stearate
98 parts water The solution is applied by one of the ordinary coating processes and dried at 200 to 300° F. for several minutes. The treated fabric is coated with resinous material such, for example, as the coating material of Example 4.

Not infrequently even greater reduction in adhesion between the coating resins and the textile fabric is effected if still another resinous treatment is applied over the first treatment previously described. These second treatments may comprise various resinous mixtures in dilute solution or other lubricant and treating materials, such, for example, as other organo-metallic complexes or organo-silicon resins.

Some resinous mixtures and metallic complexes which have been effective in the reduction of adhesion between the resinous materials and the previously treated glass fibers are as follows:

EXAMPLE 8

*Second fiber finishing compound*

15 parts buna N synthetic rubber
10 parts vinyl chloride-acetate copolymer
75 parts carbitol The treating material is applied by a dipping process onto a textile fabric having the fibers previously treated with the compound described in Example 6. The treated fabric is dried at temperatures ranging from 250 to 400° F. and then coated with the resinous materials set forth, such, for example, as that described in Example 3.

EXAMPLE 9

*Second finishing compound*

1 part cyano acetic acid
1–3 parts chromic chloride
98–96 parts water

The textile fabric of glass fibers which have been previously sized and treated with a compound described, such, for example, as that of Example 6, is coated with the above composition and dried at 200 to 300° F. This treated fabric is then coated with the resinous material which has less adhesion to the chromic-complex formed on the above composition.

These treating materials effectively inhibit the complete wetting of the fibers by the coating compositions, so that ready flow of the coating compound, as by penetration into the yarn is effectively resisted. The resin solutions, emulsions or dispersions, as a result, merely coat the outer wall of the yarn and not the fibers in the yarn bundle. The fibers are left free to move relative to each other. These treating materials also improve the wet strength of the composite mass so that a more desirable product results.

The product of this invention may be in the form of either fairly rigid sheet stock or pliable treated fabric depending upon the degree to which the resinous material is plasticized. The product is produced in the form of a sandwich of two or more layers or films of resinous material 15 and 16 having between them a textile fabric of glass fibers 17. The resin 24 may be applied from a solution or dispersion having sufficient flow substantially to fill the interstices 25 between the yarns and only partially to impregnate the glass fiber yarns 26, as illustrated in Figure 6 of the drawings. Thus the glass fibers in the strand or yarn 26 are not bonded one to another and are free for relative movement. In this instance a subsequent heating and pressing operation may not be necessary to effect the interlocking. But, if the resin and glass fibers are applied, as previously described and illustrated in Figure 3 of the drawings, they are combined between heated platens or rolls in a manner to render the resinous material plastic so that it may flow through the interstices of the cloth. Thus, the resinous films are joined together at spaced apart points 18, but they do not completely coat the fibers to impair their movement or function. Where resin and fiber contact is made, the lack of adhesion enhances the ability of their movements relative to each other.

Pliable sheets of the type described are suitable as a textile fabric for electrical insulation tapes, tarpaulins, awnings, tentings, drapes, shower curtains, raincoats or the like, whereas the more rigid formable sheets may be molded into lamp shades, trays, window lights or the like, or laminated to form table tops, panels, or other structural or decorative items where exceptional tear and breaking strengths are desired.

Selectively, a resinous compound having an index of refraction similar to that of the glass fiber compound might be used to produce substantially transparent sheets. In a similar manner, resin and resinous combinations may be formulated which will not support combustion so as to produce a non-inflammable treated textile fabric. Included in the later group of resins are the vinyl chlorides and their copolymers with the vinyl acetates, vinylidene chloride, chlorinated styrene and the like. Suitable non-inflammable plasticizers adapted to be compounded with various resins to reduce their inflammability comprise the aromatic phosphates such as tricresylphosphate, chlorinated paraffins or aromatics and the like.

One excellent fabrication of the type described is illustrated as a flexible hose H in Figure 5 and comprises a glass fiber fabric in the form of a sleeve 20 sandwiched between outer and inner layers 21 and 22 respectively of resinous material of the types described. These are combined in the ways described so that small islands 23 of resin flow through the interstices of the sleevings to join the resin films comprising a composite structure suitable for many purposes and able to withstand considerable pressures tending to burst the tubing.

Resinous materials, as previously described, are suitable for this purpose, including such formulations, for example, as set forth in Examples 1 to 4. These compositions may be applied to the sleeving by the dip-squeeze method, the resinous composition having the desired viscous flow to enable coating of the fabric, but not sufficient flow to provide complete impregnation of the individual yarns. Or the resin compositions may be applied by a form of the knife coating process. I have found that a vinyl-chloride-acetate copolymer having a solids content of approximately 35 percent in methyl ethyl ketone solvent is suitable for dipping or knife coating purposes, but several passages are required before sufficient film thickness is built up. Preferably, applications can be made by the knife coating process, first on one face and then on the other or simultaneously on both, especially if a resinous material is used having high solids content such as the "plastisols" of Example 4, the "organosols" illustrated by Example 3, or hot melts illustrated by the highly plasticized ethyl cellulose materials or the like.

According to this invention, there is produced a textile fabric of glass fibers having the added attributes of formability and imperviousness without sacrificing desirable characteristics of the glass fibers. In addition, there is produced a formable plastic sheet having improved characteristics of tear, bursting, tensile and breaking strengths, heat resistance, electrical resistance, puncture resistance, and dimensional stability without impairing the function of the resinous materials. It is also apparent that plastic sheets might be more economically produced by coating a resinous film on a backing material of the type described to impart improved characteristics to the composition of matter.

It is to be understood that even where good adhesion between the glass and resinous material might be obtained, the spirit of the invention may still be carried out by the pretreatment of the glass fibers to reduce the adhesion or by combining the resin as a material having such viscosity, as in the above examples, so that complete impregnation of the yarns is not effected, leaving the individual fibers uncoated and free to move relative to each other.

It is to be further understood that other changes in the manner of resin application, fibrous fabric structure, or resinous materials may be effected without departing from the spirit of the invention, especially as defined in the appended claims.

I claim:

1. The method of making a sheet of the type described, consisting of forming a textile fabric of strands of glass fibers, coating the fibers with a resinophobic composition that lubricates the fibers, and reduces the wetting out and adhesion of resinous materials to the fiber surfaces and selected from the group of Werner complex compounds having an organic acido group coordinated with the trivalent nuclear chromium atom, organosilicon compounds and cationic amine salts, coating the textile fabric with a viscous resinous composition whereby the resin flows through some of the interstices between strands of the fabric, but does not enter the strands to any appreciable extent so that the glass fibers remain substantially free of the resin to permit relative movement, and then treating the coated fabric to harden the resinous materials.

2. The method of making a sheet of the type described consisting of forming a textile fabric of strands of glass fibers, coating the fibers with a resinophobic composition having lubricating characteristics to reduce the wetting out and adhesion of resinous materials to the glass fiber surfaces, coating the textile fabric with a pliable film of a resinous material which because of the resinophobic characteristics of the glass fiber surfaces is incapable of substantial penetration into the strands to bind the glass fibers but is capable of penetration through the interstices between the strands in the fabric to form resinous islands by which the coatings are interlocked one with the other, and then treating the coated fabric to harden the resinous material.

LAWRENCE P. BIEFELD.

References Cited in the file of this patent

UNITED STATES PATENTS

| Number | Name | Date |
| --- | --- | --- |
| 2,133,183 | Baird et al. | Oct. 11, 1938 |
| 2,184,326 | Thomas | Dec. 26, 1939 |
| 2,204,859 | Hyatt et al. | June 18, 1940 |
| 2,209,850 | Shand et al. | July 30, 1940 |
| 2,224,274 | Powers | Dec. 10, 1940 |
| 2,243,917 | Owens | June 3, 1941 |
| 2,281,635 | Strauss | May 5, 1942 |
| 2,354,110 | Ford et al. | July 18, 1944 |
| 2,383,733 | Parker | Aug. 28, 1945 |
| 2,404,904 | Collins | July 30, 1946 |
| 2,414,125 | Rheinfrank | Jan. 14, 1947 |
| 2,419,440 | Delmonte | Apr. 22, 1947 |